United States Patent [19]

Hanss et al.

[11] Patent Number: 4,656,471

[45] Date of Patent: Apr. 7, 1987

[54] CIRCUIT ARRANGEMENT FOR CONNECTING A SUBSCRIBER TO A BUS LINE VIA SWITCH MEANS UNDER WHICH PREVENTS DISABLING OF THE BUS LINE IN THE EVENT OF DRIVER FAILURE

[75] Inventors: Karl Hanss, Kandel; Karl Schupp, Karlsruhe; Siegfried Block, Kandel, all of Fed. Rep. of Germany

[73] Assignee: Siemens Aktiengesellschaft, Munich, Fed. Rep. of Germany

[21] Appl. No.: 695,269

[22] Filed: Jan. 28, 1985

[30] Foreign Application Priority Data

Jan. 26, 1984 [DE] Fed. Rep. of Germany ....... 3402633

[51] Int. Cl.⁴ .............................................. G08C 25/00
[52] U.S. Cl. ................................. 340/825.16; 371/15; 371/22; 375/10
[58] Field of Search ................ 340/825.16; 178/69 G; 179/175, 3 F; 361/59, 64, 60, 66, 68, 81, 88; 370/13, 85, 92, 93, 95; 375/10; 371/15, 22, 24, 25, 67; 324/51, 52

[56] References Cited

U.S. PATENT DOCUMENTS

| | | | |
|---|---|---|---|
| 4,236,087 | 11/1980 | Kaminski et al. | 307/200 |
| 4,281,380 | 7/1981 | DeMesa, III et al. | 370/94 X |
| 4,320,502 | 3/1982 | deVeer | 370/85 |
| 4,359,731 | 11/1982 | Beauford et al. | 370/85 X |
| 4,376,278 | 3/1983 | Jacobsthal | 371/22 X |
| 4,561,094 | 12/1985 | Jackowski et al. | 371/24 |
| 4,564,838 | 1/1986 | Boulogne et al. | 370/85 X |

FOREIGN PATENT DOCUMENTS 2647367 12/1982 Fed. Rep. of Germany.

*Primary Examiner*—Ulysses Weldon
*Attorney, Agent, or Firm*—Kenyon & Kenyon

[57] ABSTRACT

In bus systems, the subscriber stations transmitter/receiver of which each are connected to a bus line via a transmitter/receiver in a low impedance state, the problem exists that in the event of a disturbance of a transmitter or a short circuit at a transmitter, the bus line is coupled to a constant potential and thereby blocked. In order to prevent this, electronic switches which are switched into conduction only during transmission and have otherwise high impedance are connected between the outputs of the transmitters and the bus line.

10 Claims, 2 Drawing Figures

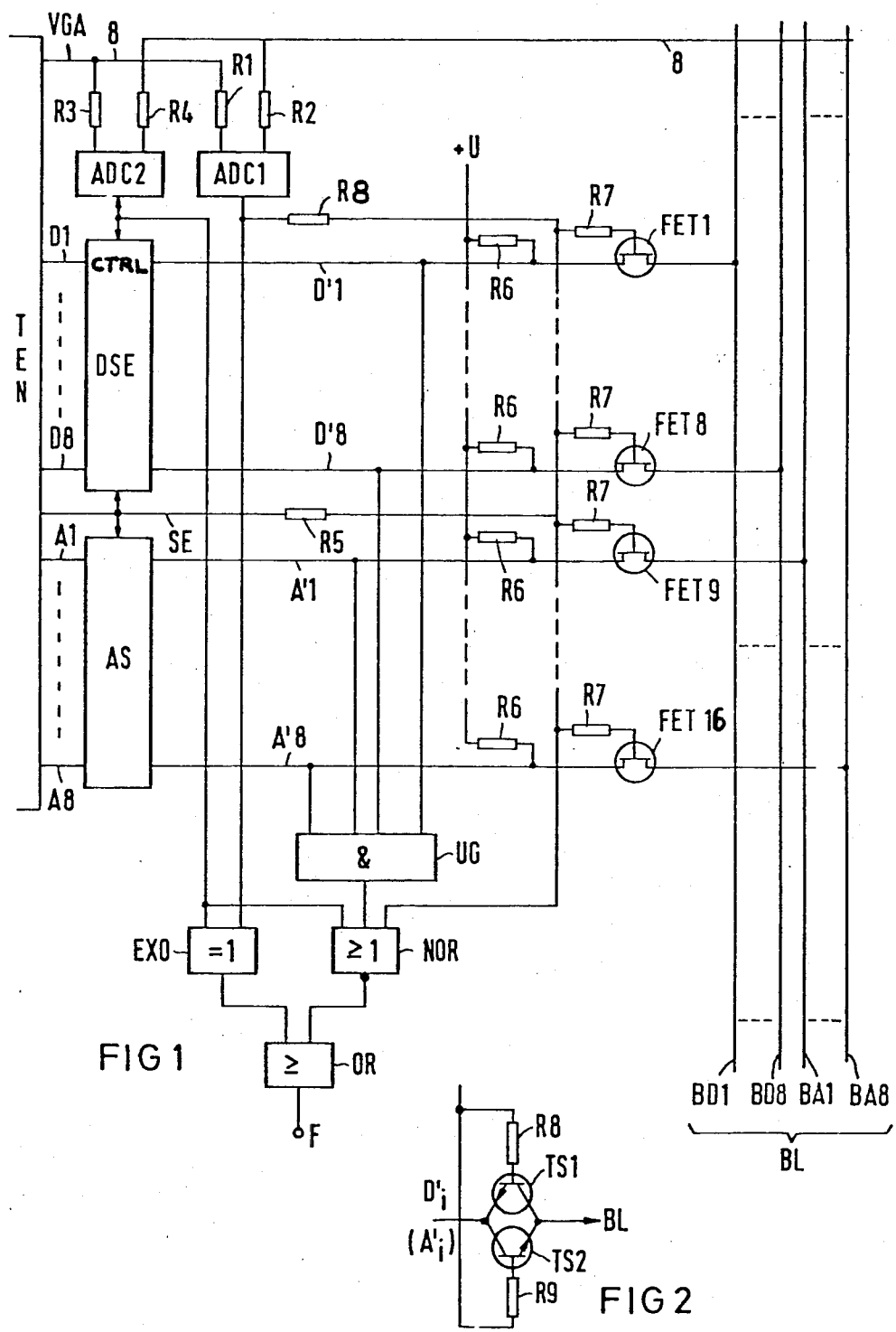

CIRCUIT ARRANGEMENT FOR CONNECTING A SUBSCRIBER TO A BUS LINE VIA SWITCH MEANS UNDER WHICH PREVENTS DISABLING OF THE BUS LINE IN THE EVENT OF DRIVER FAILURE

BACKGROUND OF THE INVENTION

The present invention relates to a circuit arrangement for connecting a subscriber to a bus line.

In systems in which information is transmitted between several subscriber stations, bus lines are frequently used, to which the subscriber stations are connected in parallel. The stations may be information sources, sinks or combined sources/sinks. For connecting the stations to the bus line, transmitters, receivers or combined transmitter/receiver modules are employed. While the receivers can be connected to the bus line at a high impedance level via resistors, i.e., passive components, and therefore, in the event of a short circuit between a signal conductor and another signal conductor, to ground or against a supply voltage, the signal level on this short-circuited conductor is not influenced detrimentally, the transmitters are connected to the bus line at a low impedance level, which, in case of a short circuit, leads to the situation that at least one conductor of the bus line is connected to constant potential and the bus line is thereby blocked. The transmission of data between the subscriber stations is then no longer possible, whereby practically the entire system has failed. To avoid this problem, it is known from DE-AS No. 26 47 367 to design the bus line and the connections of the subscriber stations redundantly. With such an arrangement, the main advantage of bus systems, namely, the relatively low cost, thereby is reduced, however.

In U.S. Pat. No. 4,236,087, the problem is described that in bus systems, one defective subscriber station can block the whole system. In order to avoid this, the defective station is electrically separated from the data bus. To this end, the line drivers are switched in the event of a distrubance, into the blocked state by an isolation control register. With such a circuit, the station can then be separated effectively from the bus line if the defect is, for instance, in the control of the circuit. In the event of a defect of a line driver, for instance, a short to ground, the circuit is inoperative, however. Also, the line drivers are blocked only if a defect has been recognized.

SUMMARY OF THE INVENTION

It is, therefore, an object of the present invention to provide a circuit arrangement for connecting subscriber stations to a bus line which prevents the bus line from being blocked if a defect in a transmitter or a receiver of a subscriber station occurs, even if this defect occurs in a line driver.

The above and other objects of the present invention are achieved by a circuit arrangement for coupling a subscriber device to a bus line comprising transmitter means coupled between the subscriber device and the bus line, the transmitter means being coupled in a low impedance state to the bus line upon receipt of a first signal and in a high impedance state in the absence of the signal, the circuit arrangement further comprising electronic switch means which is switched into conduction if the first signal is received, the switch means being coupled between the transmitter means and the bus line.

The electronic switch means preferably is operated without supply voltage, and thus there is no danger that the supply voltage could get to the bus line and block the latter in the event of a disturbance.

BRIEF DESCRIPTION OF THE DRAWINGS

The invention will be described in greater detail in the following detailed description with reference to the drawings in which:

FIG. 1 is a diagram of one embodiment of the invention; and

FIG. 2 is a diagram of another embodiment of the electronic switches shown in FIG. 1.

DETAILED DESCRIPTION

With reference now to the drawings, in FIG. 1, a bus line is designated with BL which comprises eight data lines BD1 ... BD8 and eight address lines BA1 ... BA8. In addition, control lines may be provided. To the bus line BL, several subscriber stations are connected, of which one is indicated in FIG. 1 and is designated with TEN. Between the subscriber stations and the bus line BL, a data transmitting and receiving unit DSE, as well as an address transmitting unit AS and field-effect transistors FET1 ... FET8, ... FET9 ... FET16, are connected. For transmitting data, the subscriber station TEN switches, as a result of a signal on line SE, the data transmitting and receiving unit as well as the address transmitting unit AS to transmitting mode. In addition, the field effect transistors FET1 ... FET16 are switched into conduction by the same signal SE which is brought via a decoupling resistor R5 so that then the bus line BL is connected via connecting lines D'1 ... D'8, A'1 ... A'8 directly to the units DSE, AS. The connecting lines D'1 ... D'8, A'1 ... A'8 are connected to a potential +U via resistors R6. The unit DSE can be controlled via a further decoupling resistor by the signals on the line SE. The subscriber station TEN further switches the address of the subscriber station to which data are to be sent, to the address transmitting unit AS, via lines A1 ... A8. These data are fed via lines D1 ... D8 to the data transmitting and receiving unit DSE. The addresses and the data are switched by the units AS, DSE at low impedance to the lines A'1 ... A'8, D'1 ... D'8 and are coupled to the bus line BL via the electronic switches FET1 ... FET16.

After the transmitting processing is completed, the signal on the line SE is removed so that the electronic switches FET1 ... FET16 are blocked and the outputs of the transmitting units DSE, AS are at high impedance. The potential at the units DSE, AS on the lines D'1 ... D'8, A'1 ... A'8 connecting the electronic switches FET1 ... FET16 is then approximately equal to the potential +U, to which these connecting lines are connected via the pull up resistors R6. The AND condition at the input of AND stage UG is thereby met so that a logical "1" signal appears at its output, which is fed to a NOR stage. The output signal of the latter is therefore zero and also that of an OR-stage which is connected to the latter if likewise no logical "1" signal is fed to its second input which is connected to an Exclusive-OR stage EXO. The signal at output F is therefore a logical "0" as a sign that no defect is present in the circuit connecting the subscriber station TEN to the bus line BL. If a defect occurs in one of the units, DSE, AS, for instance, a short between data or between address lines, this has no influence on the bus line BL because the units DSE, AS are separated from the bus line by the field effect transistors FET1 ... FET16. A defect of the transistors FET1 ... FET16 has the effect that each time when a "0" signal is transmitted on the corresponding conductor BD1 ... BA8 of the bus line BL, the latter may be coupled to the connecting line D'1 ... A'8 and cancels the AND condition at the input of the AND state UG. In this case a logical "1" appears as a fault signal at the output F and the disturbance is recognized so that it can be corrected before the bus line BL is blocked by a further defect in the units DSE, AS. Similarly, also faults in the units DSE, AS are recognized which lead to the presence of "0" signal on one of the lines D'1 ... A'8 if the transistors FET1 ... FET16 are cut off.

While information is being transmitted, the AND condition at the input of the AND stage UG is not met. So that this is not indicated as a fault, the logical "1" signal which is present behind the decoupling resistor R5 when transmitting, is fed to a second input of the NOR stage NOR so that the latter's output signal is a logical "0", independently of the output signal of the AND stage UG. The output of a fault signal is therefore blocked during transmitting.

For receiving data, a receiver can be connected to the bus line BL for each subscriber station. The receiver inputs are advantageously decoupled from the bus line via resistors, so that defects in the receiver cannot influence the signal level on the bus line. Frequently, however, combined data transmitting and receiving units are used, as in the embodiment shown in FIG. 1, so that the received as well as the transmitted data are present on the same connecting lines. The direction of the data transmission is set by control signals which are fed to the data transmitting and receiving circuit. According to a further embodiment of the invention, it is to be prevented also in such arrangements that the bus line is blocked by a defect in the circuit connecting the bus line to the subscriber station TEN. To this end, the circuit described so far is supplemented so that an address decoder ADC1 is connected at each subscriber station, via a decoupling resistor R2, to the conductors BA1 ... BA8 of the bus line BL. The former compares the received address with the address of the corresponding subscriber station fed in via a resistor R1. In the event of equality it gives a conduction signal to the electronic switches FET1 ... FET8 via a resistor R8, so that the data on the conductors BD1 ... BD8 of the bus line BL are forwarded to the data transmission and receiving unit DSE via the connecting lines D'1 ... D'8, the unit DSE being switched to "receiving" by the address decoder. In the rest state, the connecting lines D'1 ... D'8 as well as the data transmitting and receiving unit DSE remain separated from the bus line BL, so that defects can be recognized in the manner already described above, by means of the AND stage UG. So that the output of a defect signal also is blocked during the reception of data, the control signal for the transistors FET1 ... FET8 is fed to the second input of the NOR-stage.

The disadvantage of the circuit described so far having a single address decoder ADC1 is that in case of a faulty address decoder, the transistors FET1 ... FET8 may be switched into conduction, and a possible short in the data transmitting and receiving unit DSE may be coupled to the bus line BL and the subscriber station TEN reacts because it appears to have been addressed. The bus line BL is therefore blocked, at least partially. In order to avoid this fault, a second address decoder ADC2 is provided. The output signals of the two address decoders ADC1, ADC2 are compared with each other in the already mentioned Exclusive-OR stage EXO which delivers a fault signal via the OR-stage in the event of inequality. While the address decoder ADC1 addresses the field effect transistors FET1 ... FET8, the control input CTRL of the data transmitting and receiving unit DSE is connected to the output of the address decoder ADC2. If the decoder ADC2 ascertains agreement of the two addresses fed to it via resistors R3 and R4, it switches the unit DSE to "receiving". In the event of a faulty address decoder, either only the switching transistors can be switched into conduction, or the unit DSE switched to receiving. Simultaneous addressing of the transistors and the unit DSE is not possible, so that the signals on the bus line are not disturbed.

The embodiment of the invention according to FIG. 1 can be modified in many respects within the scope of the invention. For instance, any other electronic switches desired can be used instead of the field effect transistors FET1 ... FET16, for instance, bipolar transistors, as shown in FIG. 2. The latter comprise two transistors TS1, TS2 which are connected anti-parallel and are driven via resistors R8, R9 respectively. The series resistors R7 shown in FIG. 1 can then be omitted. The emitter of the transistor TS1 and the collector of the transistor TS2 are connected to the connecting lines D'1 ... A'8 and the collector of the transistor TS1 and the emitter of the transistor TS2 are connected to the bus line BL.

The addressing of the electronic switches can be divided up in such a manner that, for transmitting addresses, only the transistors FET9 ... FET16 and for transmitting and receiving of data, the transistors FET1 ... FET8 are switched into conduction. Similarly, the AND stage UG will then also be subdivided, so that defects in the data connecting lines D'1 ... D'8, and on the address connecting lines A'1 ... A'8 can be recognized separately. The logic circuit which recognizes disturbances by comparing the potential on the connecting lines, blocks the output of defect signals during the transmitting or receiving of signals and checks the functioning of the address decoders ADC1, ADC2, and can also be designed in a manner different from that of the manner shown, in order to fulfill the desired function.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:
1. A circuit arrangement for coupling a subscriber device to a bus line comprising transmitter means coupled between the subscriber device and the bus line, the transmitter means being coupled in a low impedance state to the bus line upon receipt of a first signal from the subscriber device and in a high impedance state in the absence of said signal, the circuit arrangement further comprising electronic switch means comprising a switching path and a control input, the switching path being switched into conduction if said first signal is received at said control input, said switching path of said switch means being coupled between said transmitter means and said bus line, a plurality of connecting lines between the transmitter means and the electronic switch means being provided, the connecting lines each being coupled via a resistor to a constant potential source, and further comprising logic means coupled to the connecting lines for providing a fault signal in the event of different potentials on the connecting lines, said logic means providing said fault signal in the event at least one of said switch means short circuits, whereby a selected logic signal from said bus line on at least one of said connecting lines due to said short circuited switch means will be coupled to said logic means thereby to generate said fault signal.

2. The circuit arrangement recited in claim 1, wherein the electronic switch means comprises transistor means.

3. The circuit arrangement recited in claim 1, wherein the logic means comprises AND gate means.

4. The circuit arrangement recited in claim 1, further comprising means for inhibiting the generation of the fault signal during transmission by said transmitter means to said bus line, said means for inhibiting having said first signal as an input and being coupled to said logic means for inhibiting the production of said fault signal by said logic means during transmission by said transmitter means to said bus line.

5. The circuit arrangement recited in claim 1, wherein the transmitter means comprises a transmitting and receiving means and further including an address decoder means coupled to the bus line which switches the electronic switch means into conduction if an address received on the bus line is the same as the address of the subscriber.

6. The circuit arrangement recited in claim 5, further comprising second address decoder means coupled to the bus line, said second address decoder means allowing the transmitting and receiving means to receive data from the bus line if the received address is the same as the subscriber address.

7. The circuit arrangement recited in claim 6, wherein said logic means further comprises fault signal inhibit means for inhibiting the generation of the fault signal if the received address and the subscriber address are the same, said fault signal inhibit means being coupled to an output of said second address decoder means.

8. The circuit arrangement recited in claim 7, wherein said fault signal inhibit means comprises NOR gate means connected to an output of said logic means.

9. The circuit arrangement recited in claim 6, further comprising additional logic means coupled to the first and second address decoder means for delivering a fault signal if output signals of the first and second address decoder means are not the same.

10. The circuit arrangement recited in claim 9, wherein said additional logic means comprises exclusive-OR gate means.

* * * * *